(12) United States Patent
Gustafson et al.

(10) Patent No.: US 8,358,913 B2
(45) Date of Patent: Jan. 22, 2013

(54) RESOLVING RECORDING CONFLICTS

(75) Inventors: Joshua Gustafson, Bothell, WA (US); Mark Schwesinger, Bellevue, WA (US); Jessica Zahn, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 1134 days.

(21) Appl. No.: 12/040,755

(22) Filed: Feb. 29, 2008

(65) Prior Publication Data

US 2009/0220208 A1  Sep. 3, 2009

(51) Int. Cl.
*H04N 5/76* (2006.01)
(52) U.S. Cl. .................. 386/292; 386/291; 386/293
(58) Field of Classification Search ........... 386/291–293
See application file for complete search history.

(56) References Cited

U.S. PATENT DOCUMENTS

| 7,003,791 | B2 * | 2/2006 | Mizutani ................... 725/21 |
| 7,765,235 | B2 * | 7/2010 | Day et al. .................... 707/795 |
| 2002/0118954 | A1 | 8/2002 | Barton |
| 2002/0168178 | A1 | 11/2002 | Rodriguez |
| 2004/0013409 | A1 | 1/2004 | Beach |
| 2005/0273819 | A1 | 12/2005 | Knudson |
| 2006/0035610 | A1 | 2/2006 | Potrebic |
| 2006/0037047 | A1 | 2/2006 | DeYonker |
| 2006/0037048 | A1 | 2/2006 | DeYonker et al. |
| 2006/0064720 | A1 | 3/2006 | Istvan |
| 2006/0104611 | A1 | 5/2006 | Gildred |
| 2006/0268099 | A1 | 11/2006 | Potrebic |
| 2007/0230903 | A1 * | 10/2007 | Sakatani et al. ............ 386/92 |
| 2008/0155607 | A1 * | 6/2008 | Klappert .................... 725/58 |
| 2008/0184297 | A1 * | 7/2008 | Ellis et al. ................ 725/39 |
| 2008/0273856 | A1 * | 11/2008 | Bumgardner et al. .......... 386/64 |

FOREIGN PATENT DOCUMENTS

| EP | 1187467 A3 | 8/2003 |
| WO | 02069636 A1 | 9/2002 |

OTHER PUBLICATIONS

Release Notes for Windows XP Media Center Edition 2005 http://support.microsoft.com/kb/887793.

* cited by examiner

*Primary Examiner* — Philip Chea
*Assistant Examiner* — Ghazal Shehni
(74) *Attorney, Agent, or Firm* — Vierra Magen Marcus & DeNiro LLP

(57) ABSTRACT

A system and methods of incrementally updating a recording schedule in response to changes in user requests and changes in availability of requested content. Changes to the recording schedule may be prompted by a user request to record new content, a change in the parameters of an existing request, removal of a request, and the like. Before changing the recording schedule, an algorithm generates new possible recording schedules by combining recording assignments for a given program with the existing recording schedule. In one embodiment, the algorithm reduces the new possible recording schedules to a final recording schedule and applies the final recording schedule to a digital recording device. In another embodiment, the final recording schedule is presented to a user for approval before the schedule is applied to the digital recording device.

18 Claims, 6 Drawing Sheets

RESOLVING RECORDING CONFLICTS

BACKGROUND

Television programs are commonly recorded on hard disks in digital recorders associated with televisions. These digital recorders are often referred to as a personal video recorder (PVR) or a digital video recorder (DVR). Traditional PVRs and DVRs have a fixed number of tuners which can be used to record content from a broadcast source, which limits the number of shows that can be simultaneously recorded at any given time. If the user requests that too many shows be recorded at once, the only recourse is to prompt the user to ask which subset of those shows are most important to record and to fail to record the rest.

Another recent development is the electronic program guide (EPG), which graphically displays television program's listings on television screens. Although there are various EPGs being used today, EPGs typically display programs in a grid format for multiple channels and various time slots. Accordingly, the viewer scrolls along both horizontal and vertical axis to identify television programs being broadcast at different times and on different channels. The EPG allows a viewer to easily learn what program is being broadcast on a specific channel during a specific time.

While EPGs can assist the viewer in identifying when programs are being broadcast, they have also been used to streamline the process of programming recording systems. For instance, depending upon the user interface associated with the PVR that includes the EPG, a viewer can use specific features on the user interface (UI) of the PVR to program a recording. For example, the viewer may simply select a box or region corresponding to a program within the EPG in order to schedule the program for recording. Alternatively, the viewer may be required to go to a different user interface page or display to cause the recording system to be programmed appropriately.

Programs (also referred to as "broadcast content") are now available through alternate sources. For example, episodes of television programs are now commonly available as a digital download or streaming media. The same is true for movies. Yet PVRs and DVRs cannot resolve a recording conflict by obtaining the broadcast content with identical or overlapping broadcast times by obtaining the broadcast content from an alternate source.

SUMMARY

One aspect of the present technology is to provide a method that automatically generates a new recording schedule when a user adds a program request to an existing recording schedule. When a request is received from a user to record a program, the method identifies all recording assignments associated with the program. The recording assignments associated with the program are grouped together according to a first comparison metric. The groups of recording assignments associated with the program are combined with the recording assignments associated with the other programs in the existing recording schedule until at least one new recording schedule is generated. If more than one new recording schedule is generated, the system reduces the new recording schedules to a final recording schedule. The existing recording schedule is then replaced with the final recording schedule.

One aspect of the present technology is to provide a method that generates a new recording schedule when a user deletes a program from an existing recording schedule. In one embodiment, the method attempts to reschedule one of the program assignments remaining in the existing recording schedule into the time period made available by the deleted program assignment. The method identifies the time period and tuner associated with the deleted program assignment. For each program assignment remaining in the existing recording schedule, the method identifies the program associated with the program assignment, identifies additional program assignments that have a time period that overlaps the time period associated with the deleted program assignment, and determines whether any of the additional program assignments are preferable over the program assignment in the existing recording schedule. If any of the additional program assignments are preferable over the program assignment in the existing recording schedule, the method designates the program associated with the program assignment to be rescheduled. The method attempts to generate a new recording schedule that includes at least one additional program assignment associated with a program that was designated to be rescheduled.

One aspect of the present technology is to resolve recording conflicts when new recording requests are added to an existing recording schedule. In one embodiment, the programs associated with the new recording requests are prioritized. A new recording schedule is generated based on first combining assignments of the highest priority program with the existing recording schedule. Assignments of the next highest priority program are then combined with the new recording schedule(s), creating the latest schedules. This cycle is continued until all the new recording requests have been scheduled. One of the latest schedules is selected and the digital recording devices records the programs based on the selected latest schedule.

DETAILED DESCRIPTION

The technology described herein includes methods for generating a recording schedule. For example, a digital recording device may have an existing recording schedule to obtain content previously specified by a user. When the user sends a new recording request to the digital recording device, the device identifies all assignments associated with the program. The device attempts to generate a new recording schedule that includes one of the assignments associated with the new program without deleting any of the programs currently in the existing recording schedule.

Figure 1:
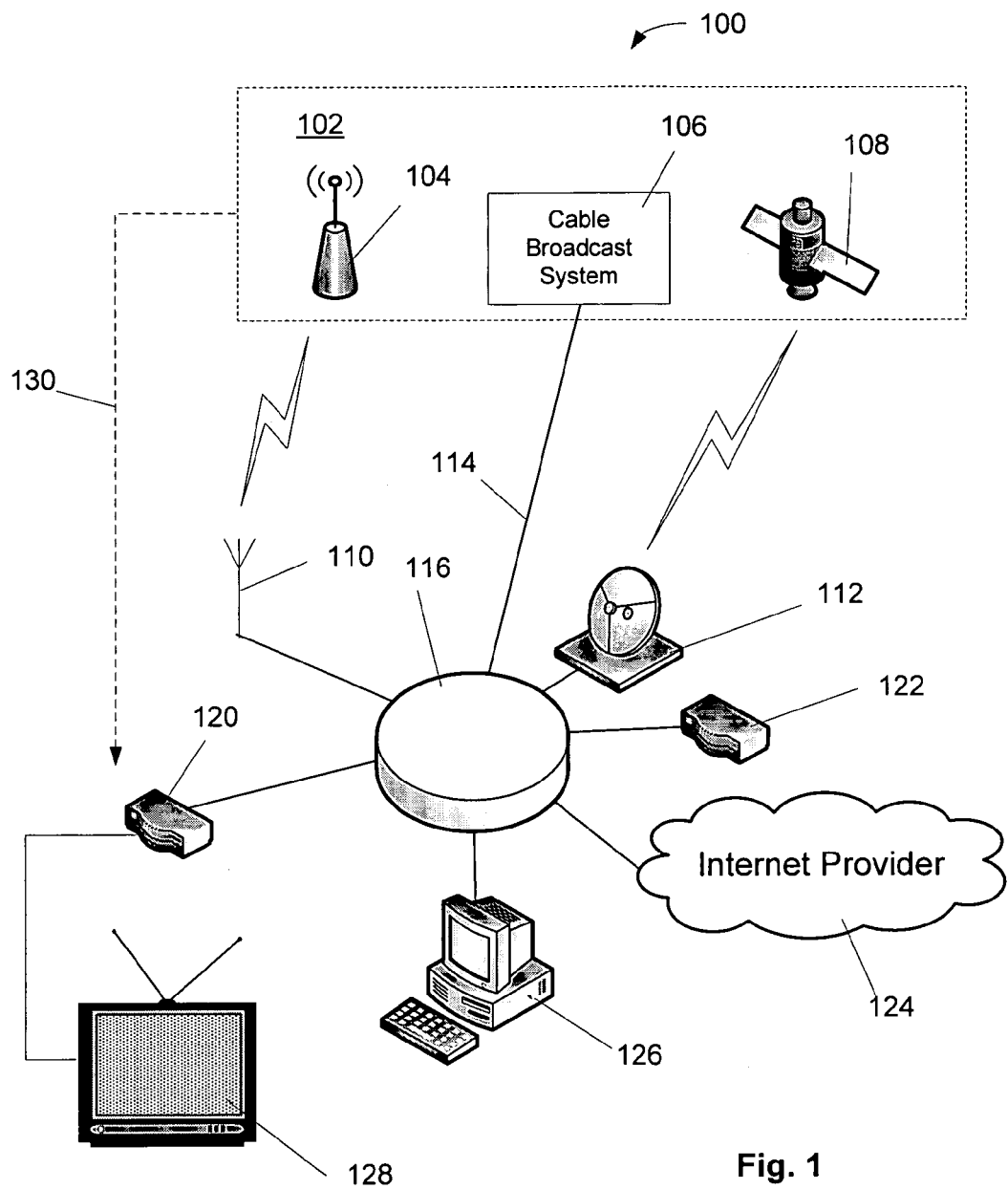
FIG. 1 depicts a schematic diagram of an embodiment of a television system.

FIG. 1 illustrates an embodiment of a television system 100. The system 100 includes a broadcast system 102 and a receiver system. The broadcast system includes a television antenna 104, a cable broadcast system 106 and a satellite broadcast system 108. The receiver system includes an antenna 110, a satellite dish 112, a first digital recorder 120, a second digital recorder 122, a personal computer (PC) 126 and a television 128. In the FIG. 1 embodiment, each of these components is connected to a network 116. The television 128 is connected to the first digital recorder 120 and is not connected directly to the network 116, as shown in FIG. 1. Of course, the television 128 may be connected directly to the network 116. The coaxial cable 114 is shown in FIG. 1 as connected directly to the network 116. The cable 114 may also be connected to other components. By way of example only, the cable 114 may also be connected directly to the computer 126, the first digital recorder 120, the second digital recorder 122 or the television 128.

The system 100 also includes an Internet provider 124 so that the system 100 may acquire content from sources other than from the broadcast system 102. For example, the system 100 may acquire a digital download of a television program. The Internet provider 124 may communicate with the network 116 (or any other component) either wirelessly, a network or any other technology known in the computer communication art. In one embodiment, the Internet may also be accessed through the coaxial cable 114 as well as the Internet provider 124. The FIG. 1 embodiment illustrates that the first digital recorder 120 may receive a broadcast signal either from the network 116 or through a wireless connection 130. Of course, the entire network 116 may comprise a wireless network.

The present technology described herein may reside in the any of the components displayed in FIG. 1. For example, software executing the methods described herein may reside in the PC 126. In another embodiment, the software may reside in the first digital recorder 120. In another embodiment, the software may reside in the second digital recorder 122. In yet another embodiment, the software may reside in a set-top box (not shown).

FIG. 1 illustrates an example of a suitable general computing system environment 201 for generating a recording schedule. It is understood that the term "computer" as used herein broadly applies to any digital or computing device or system. The computing system environment 201 is only one example of a suitable computing environment and is not intended to suggest any limitation as to the scope of use or functionality of the inventive system. Neither should the computing system environment 201 be interpreted as having any dependency or requirement relating to any one or combination of components illustrated in the exemplary computing system environment 201.

Figure 2:
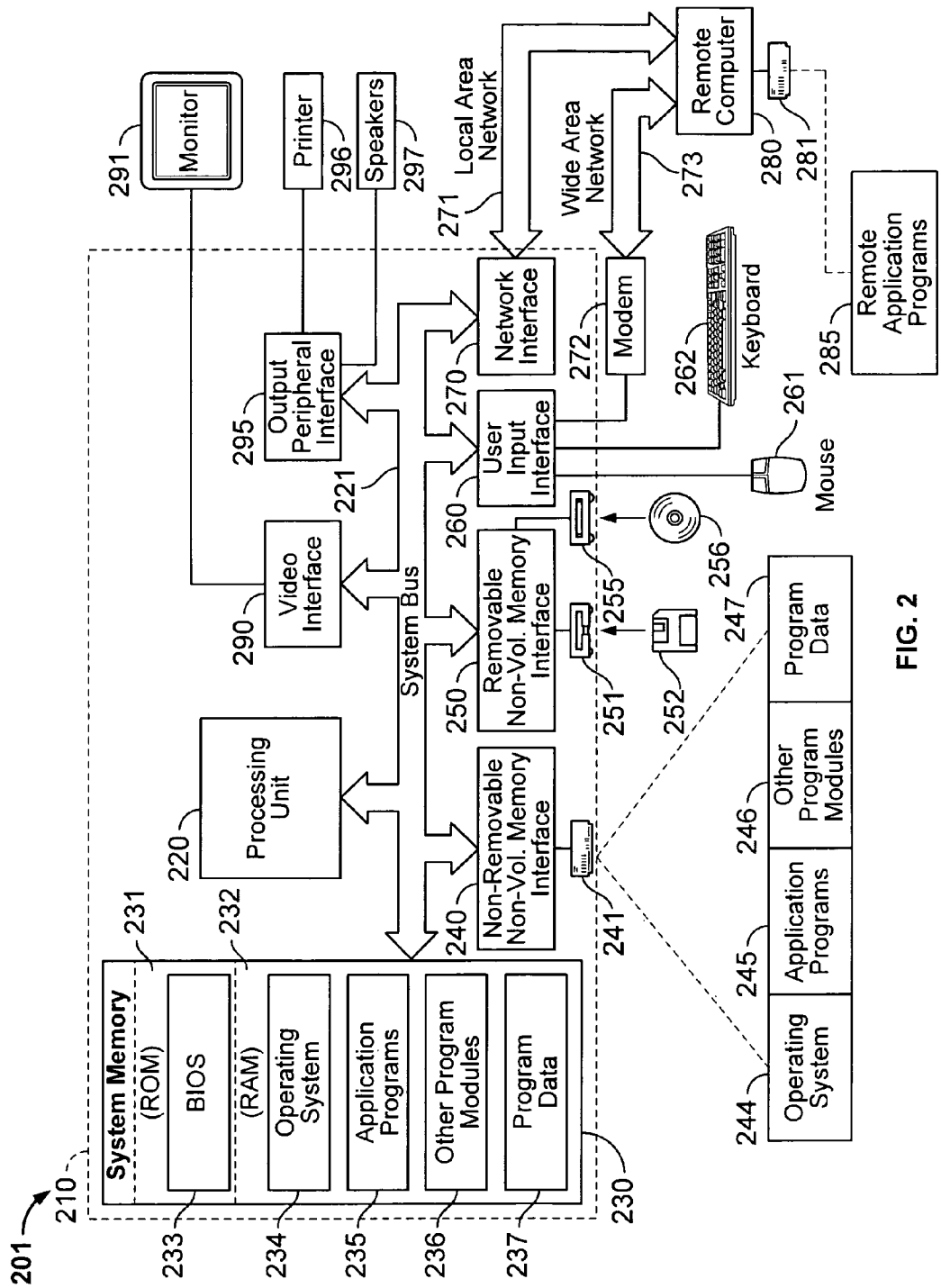
FIG. 2 depicts a block diagram of a computer system for performing the methods described herein.

With reference to FIG. 2, an exemplary system for implementing the inventive system includes a general purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 210 may include a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes volatile and nonvolatile, as well as removable and non-removable media implemented in any method or technology for storage of information such as computer readable instructions, data structures, program modules or other data. Computer storage media includes, but is not limited to, random access memory (RAM), read only memory (ROM), EEPROM, flash memory or other memory technology, CD-ROMs, digital versatile discs (DVDs) or other optical disc storage, magnetic cassettes, magnetic tapes, magnetic disc storage or other magnetic storage devices, or any other medium which can be used to store the desired information and which can be accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

The system memory 230 includes computer storage media in the form of volatile and/or nonvolatile memory such as ROM 231 and RAM 232. A basic input/output system (BIOS) 233, containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates a hard disc drive 241 that reads from or writes to non-removable, nonvolatile magnetic media and a magnetic disc drive 251 that reads from or writes to a removable, nonvolatile magnetic disc 252. Computer 210 may further include an optical media reading device 255 to read and/or write to an optical media.

Other removable/non-removable, volatile/nonvolatile computer storage media that can be used in the exemplary operating environment include, but are not limited to, magnetic tape cassettes, flash memory cards, DVDs, digital video tapes, solid state RAM, solid state ROM, and the like. The hard disc drive 241 is typically connected to the system bus 221 through a non-removable memory interface such as interface 240. Magnetic disc drive 251 and optical media reading device 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, hard disc drive 241 is illustrated as storing operating system 244, application programs 245, other program modules 246, and program data 247. These components can either be the same as or different from operating system 234, application programs 235, other program modules 236, and program data 237. Operating system 244, application programs 245, other program modules 246, and program data 247 are given different numbers here to illustrate that, at a minimum, they are different copies.

A user may enter commands and information into the computer 210 through input devices such as a keyboard 262 and a pointing device 261, commonly referred to as a mouse, trackball or touch pad. Other input devices (not shown) may include a microphone, joystick, game pad, satellite dish, scanner, or the like. These and other input devices are often connected to the processing unit 220 through a user input interface 260 that is coupled to the system bus 221, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 295.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communication over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communication link between the computers may be used.

For purposes of describing the technology herein, the user requests to record two programs: "The Office" (referred to hereinafter as "Program TO") and "Grey's Anatomy" (referred to hereinafter as "Program GA"). The user selected to record a specific airing of Program TO (HD broadcast) through the EPG and selected to record Program GA through the wish list (by requesting to record a program with the term "Grey's" in the title). There are many ways for the user to request a recording of these two programs. In one embodiment, the user selects a program through the EPG. In another embodiment, the user may request a program through a "wish list" request. Such a request comprises an agent that looks for content that matches some set of criteria. The user, without ever looking at a program guide, can request to record every program where the term "star" appears in the title. In this case, the digital recording device would attempt to record episodes of "Star Trek," "Battlestar Galactica," any airings of the movie "Star Wars," and the like. In another embodiment, the user may select programs by a keyword in the title or description. For example, the user can select programs by actor or director, category (e.g., only movies, anything but horror, etc.), and the like.

Figure 3:
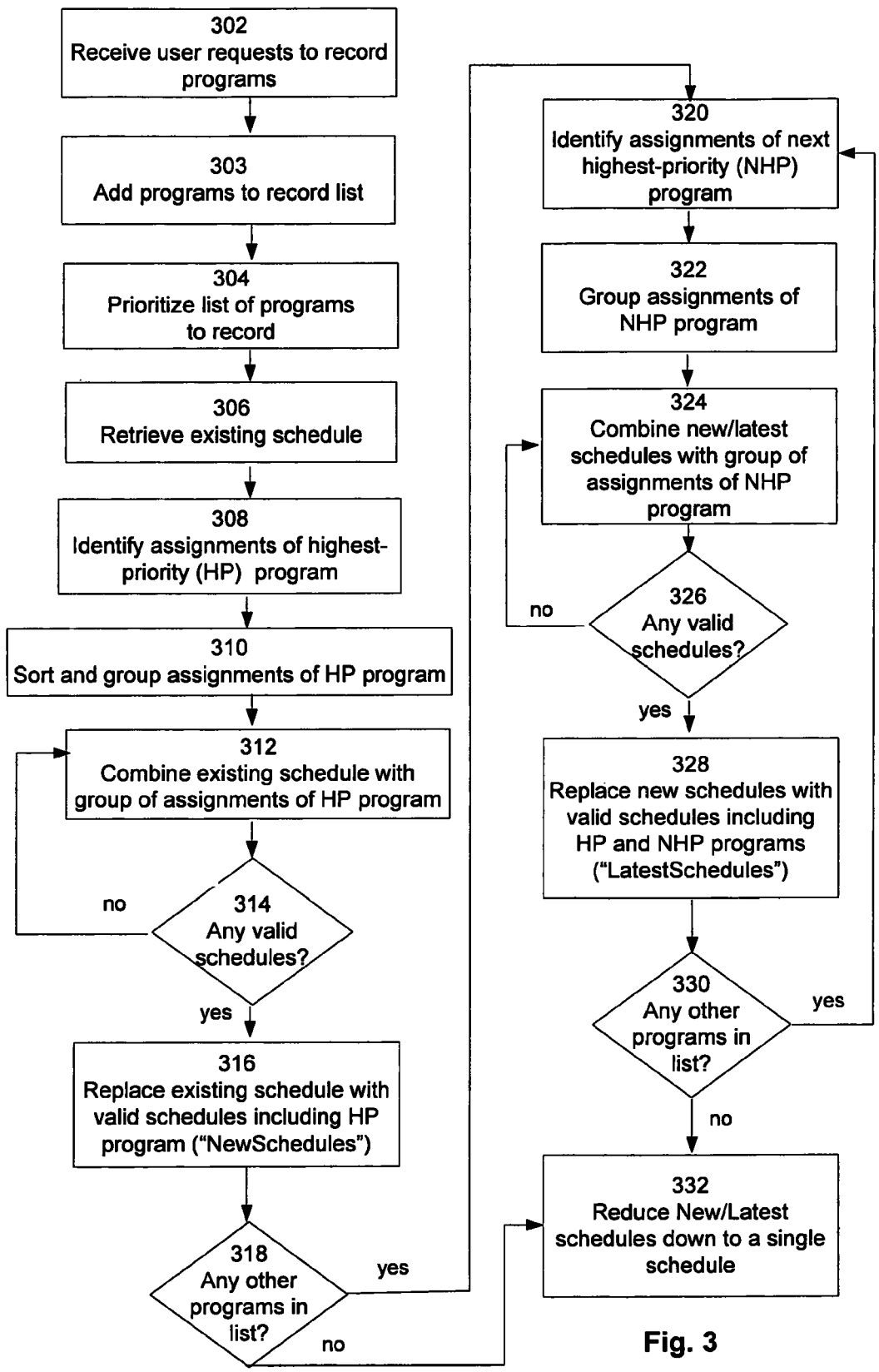
FIG. 3 depicts a flow diagram providing exemplary steps for generating a new recording schedule.

FIG. 3 illustrates a flow diagram providing exemplary steps for generating a recording schedule. In step 302, requests are received from the user to record at least one program. Using the example provided above, requests to record Program TO and Program GA are received in step 302. In step 303, the method adds Program TO and Program GA to a record list. In step 304, the programs added to the record list (Step 303) are prioritized. For purposes of describing this technology only, Program TO is a higher-priority program than Program GA. Thus, in step 304, Program TO is designated as the highest-priority program and Program GA as the second highest-priority program.

In step 306, the current recording schedule (also referred to as an "existing recording schedule") is recalled. The existing recording schedule includes assignments of other programs already scheduled to be recorded. An existing recording schedule containing no assignments is referred to as an {empty} recording schedule. The existing recording schedule may be stored in any recording device (e.g., PC, PVR, DVR, etc.). For purposes of describing the method in FIG. 3, the existing recording schedule is {empty}.

In step 308, assignments of the highest-priority program in the record list are identified. An assignment designates the information the recording device requires to acquire the program. For example, an assignment designates the channel, airing time and tuner. For the purpose of describing this technology only, three assignments of Program TO are identified in an EPG: (i) Thursday, cable channel 704 (HD) at 8 pm on tuner A (referred to hereinafter as "TO1"), (ii) Saturday, satellite channel 4 (SD) at 7 pm on tuner B (referred to hereinafter as "TO2"), and (iii) Saturday, cable channel 704 (HD) at 2 am on tuner A (referred to hereinafter as "TO3"). As will be discussed in more detail later, it is possible that Program TO will not be recorded at all and therefore, a <none> assignment (referred to hereinafter as "TO4") is added to the three assignments recognized in the EPG. Thus, in this example, the method, in step 308, identifies four assignments of Program TO: TO1, TO2, TO3 and TO4.

In step 310, the assignments of Program TO are grouped according to a first-pass comparison metric. By way of example only, the first-pass comparison metric comprises a comparison operator that is used by a sorting algorithm to compare two assignments at a time to indicate which assignment is preferable or whether the two assignments are equal. A sorting algorithm may comprise, by way of example only, quicksort, merge sort, bubble sort, and the like. These comparison-based sorting algorithms use the first-pass and second-pass comparison metrics (described in more detail later). Such sorting algorithms are well known within the computer science art and therefore, additional disclosure is not required. When the sorting algorithm is done, the assignments will be in order. Each assignment is either more preferable or equally preferable to the assignments after it in the list. Using the example provided above, the sorting algorithm uses the first-pass comparison metric to compare and group the four assignments of Program TO. By way of example only, the first-pass comparison operation includes the following five defining properties:

(1) Are either assignment A or assignment B (but not both)_already_in the process of recording?→That one is preferable.

(2) Are either assignment A or assignment B (but not both) for the "prototypical" schedule entry?→That one is preferable.

(3) Are either assignment A or assignment B more preferable based on quality?→That one is preferable.

(4) Is A urgent and does it start before B?→A is preferable (5) Is B urgent and does it start before A?→B is preferable (6) If comparison (1)-(5) do not provide an answer, A and B are equally preferable.

With regard to defining property (3), quality comprises more than just a preference for obtaining an HD broadcast. For example, the user could prefer to obtain an HD broadcast, or not care, or the user might actually prefer SD. Quality also includes more than just SD/HD. For example, the technology described herein distinguishes between "true HD," "HD signal but SD content," "Digital SD," and "Analog SD"—and these can be preferred (or not) in any order, and individually allowed/disallowed. Regardless, the possible results from comparing two assignments using the third defining property results in either "the quality of A is preferable," "the quality of B is preferable," or "the qualities of A and B are equally preferable." If either assignment is preferable based on using the third defining property (based on the settings of the request in question), the assignment is preferable. Otherwise, the sorting algorithm continues with the assignment comparison by comparing the assignments using the fourth defining property.

There are other factors that may influence group size. By way of example only, if the same airing can be recorded on three separate tuners (e.g., a digital recorder with three tuners), there may be three assignments in the same group—one assignment for each airing/tuner pair regardless of quality preference or urgency. It is also possible to have the same content in the same quality on at the same time but on a different channel. None of these assignments will be preferable over the other.

The sorting algorithm uses the second-pass comparison to compare additional characteristics of each assignment after it has completed the comparisons based on the first-pass comparison metric. For example, the sorting algorithm uses the second-pass comparison operator to compare the start time of each assignment again (for non-urgent shows). The sorting algorithm also uses the second-pass comparison metric to compares characteristics that need to be decided but which do not impact the user's preferences in any way. For example, the second-pass comparison metric may be used to comparing the tuners each assignment proposes to use and the like. Grouping of assignments is accomplished by making divisions between assignments that are not equal and grouping together assignments that are equal.

Using the example provided above, the user has not designated a quality preference associated with Program TO (e.g., prefer to acquire an HD broadcast, SD broadcast, etc.). In general, obtaining any recording of a program is preferred over the <none> assignment. Assuming that Program TO is not marked "urgent," the sorting algorithm, using the defining properties of the first-pass comparison operator, determines that TO1, TO2 and TO3 are equal and each preferable over TO4. The four assignments of Program TO are therefore divided into two groups: {TO1, TO2, TO3} and {TO4}. The three assignments in the first group are placed in order of beginning broadcast time according to the defining properties of the second-pass comparison operator.

In step 312, the current recording schedule is combined with each of the assignments of Program TO included in the preferred group. In the example provided above, the current recording schedule is {empty} (e.g., contains no current assignments). The assignments of Program TO included in the preferred group include TO1, TO2 and TO3. Thus, the method, in step 312, generates three new recording schedules:

(i) {empty}+TO1 (referred to as "NewSchedule1");

(ii) {empty}+TO2 (referred to as "NewSchedule2"); and (iii) {empty}+TO3 (referred to as "NewSchedule3").

In step 314, the new recording schedules—NewSchedule1, NewSchedule2 and NewSchedule3—are evaluated to determine if any are valid schedules. A valid schedule comprises a recording schedule that does not contain any overlapping assignments. The method evaluates each NewSchedule in priority order. By way of example only, NewSchedule1 is evaluated first, then NewSchedule2 and finally NewSchedule3. All three NewSchedules are valid because none of the three NewSchedules contains an overlapping assignment.

In one embodiment, if at least one valid NewSchedule has been generated, the current recording schedule is not subsequently combined with assignments from any of the additional groups of assignments. As described above, the assignments within the preferred group are a higher priority than the assignments in the other groups. Accordingly, combining the current recording schedule with an assignment from any of the other groups (e.g., assignments not within the preferred group) will necessarily be inferior to the NewSchedules already generated (schedules containing assignments from the preferred group). In an alternative embodiment, the current recording schedule is combined with every assignment before deciding if a valid schedule exists, in step 314.

If none of the NewSchedules were identified as valid in step 314, the method returns to step 312. In returning to step 312, the current recording schedule is combined with the assignments included in the next best group of assignments. In the example provided above, the next best group of assignments of Program TO includes TO4. Thus, the method combines the current recording schedule with TO4 and generates one potential new recording schedule: {empty}+TO4 (referred to as "Newschedule4"). In step 314, NewSchedule4 is recognized as a valid schedule because there are no overlapping assignments. Regardless of the number of groups, the last group of assignments to be combined with the recording schedule is the group with only the <none> assignment, which can always be combined with any recording schedule. Thus, the method will eventually generate one valid recording schedule.

Because, in step 314, three valid recording schedules exit, the method continues to step 316. In step 316, the current recording schedule {empty} is replaced with the three valid recording schedules: NewSchedule1, NewSchedule2 and NewSchedule3. Program TO is also removed from the record list.

In step 318, the method determines whether there are any programs remaining in the record list. If there are no programs remaining in the record list, the method proceeds to step 332. In step 332, the three NewSchedules are reduced to a single or final NewSchedule (discussed in more detail later). In one embodiment, the final NewSchedule is loaded into the digital recording device. In an alternative embodiment, the user is presented with the final NewSchedule in a UI (not shown). In the UI, the user may accept the final NewSchedule or modify it. However, if a program remains in the record list, the method does not choose a NewSchedule and instead proceeds to step 320.

In the example provided above, Program GA remains in the record list. In step 320, all assignments of Program GA are identified. For the purpose of describing this technology only, three assignments of Program GA are identified in an EPG: (i) Thursday, cable channel 707 (HD) at 8 pm on tuner A (referred to hereinafter as "GA1"), (ii) Saturday, cable channel 7

(SD) at 11 pm on tuner A (referred to hereinafter as "GA2"), (iii) Saturday, cable channel 707 (HD) at 2 am on tuner B (referred to hereinafter as "GA3"). As previously described above, the <none> assignment (referred to hereinafter as "GA4") is added to the three assignments from the EPG.

In step 322, the four assignments of Program GA are grouped according to sorting algorithm using the first-pass comparison operator described above. The four assignments of Program GA are divided into three groups: {GA1; GA3}, {GA2} and {GA4}. GA1 and GA3 are placed together in the first group (the "preferred" group) because these two assignments will record an HD broadcast of Program GA. GA2 is placed by itself in a second group (the "next best" group) because GA2 (SD broadcast) is not as preferable as GA1 or GA3 (both an HD broadcast). GA2 is not grouped with GA4 (no recording) because GA2 is preferred over GA4. As discussed above, GA4 is placed in the last group, by itself, because GA4 represents the least desirable assignment (Program GA will not be recorded at all).

In step 324, each of the NewSchedules (NewSchedule1, NewSchedule2 and NewSchdeule3) is combined with each of the assignments of Program GA in the preferred group. At this point, NewSchedule1 includes TO1, NewSchedule2 includes TO2 and NewSchdeule3 includes TO3. The assignments of Program GA included in the preferred group include GA1 and GA3. Thus, six potential latest recording schedules are generated, in step 324:

(i) TO1+GA1 (referred to as "LatestSchedule1");
(ii) TO1+GA3 (referred to as "LatestSchedule2");
(iii) TO2+GA1 (referred to as "LatestSchedule3")
(iv) TO2+GA3 (referred to as "LatestSchedule4");
(v) TO3+GA1 (referred to as "LatestSchedule5"); and
(iv) TO3+GA3 (referred to as "LatestSchedule6").

In step 326, the LatestSchedules are evaluated to determine if any are a valid recording schedule. Using the example provided above, LatestSchedule1 is not a valid recording schedule because TO1 and GA1 air at the same time (assuming that the digital recording device has a single tuner). None of the other LatestSchedules includes a similar time overlap. Thus, there are five valid LatestSchedules (LatestSchedule2-LatestSchedule6). The evaluation process performed in step 326 (and step 314) is described in more detail later.

If none of the LatestSchedules were valid, the method returns to step 324. In returning to step 324, the three NewSchedules (TO1, TO2 and TO3) are combined with the assignments of Program GA in the "next best" group of assignments. Using the example provided above, the "next best" group of assignments of Program GA includes GA2. Steps 324 and 326 would then be repeated.

Because there are five valid LatestSchedules, the method continues to step 328. In step 328, the NewSchedules (TO1, TO2 and TO3) are replaced with the five valid LatestSchedules (LatestSchedule2-LatestSchedule6). Program GA is also removed from the record list.

In step 330, the method determines if any other programs remain in the record list. At this point, the record list is empty. Program TO and Program GA have been removed from the record list. However, if a program still remained in the record list, the method returns to step 320 and repeats steps 320-328. Because the record list does not contain any programs, the method continues to step 332.

In step 332, the five valid LatestSchedules are reduced to a single LatestSchedule. As previously described above, the assignments of Program TO and Program GA were combined in priority order. Thus, the first valid LatestSchedule includes the highest-priority assignment of both Program TO and Program GA. In this case, the first valid LatestSchedule is selected. In one embodiment, the selected LatestSchedule is automatically downloaded to the digital recording device. In another embodiment, the selected LatestSchedule is provided to the user (e.g., through a UI) for approval before the schedule is downloaded to the digital recording device.

Figure 4:
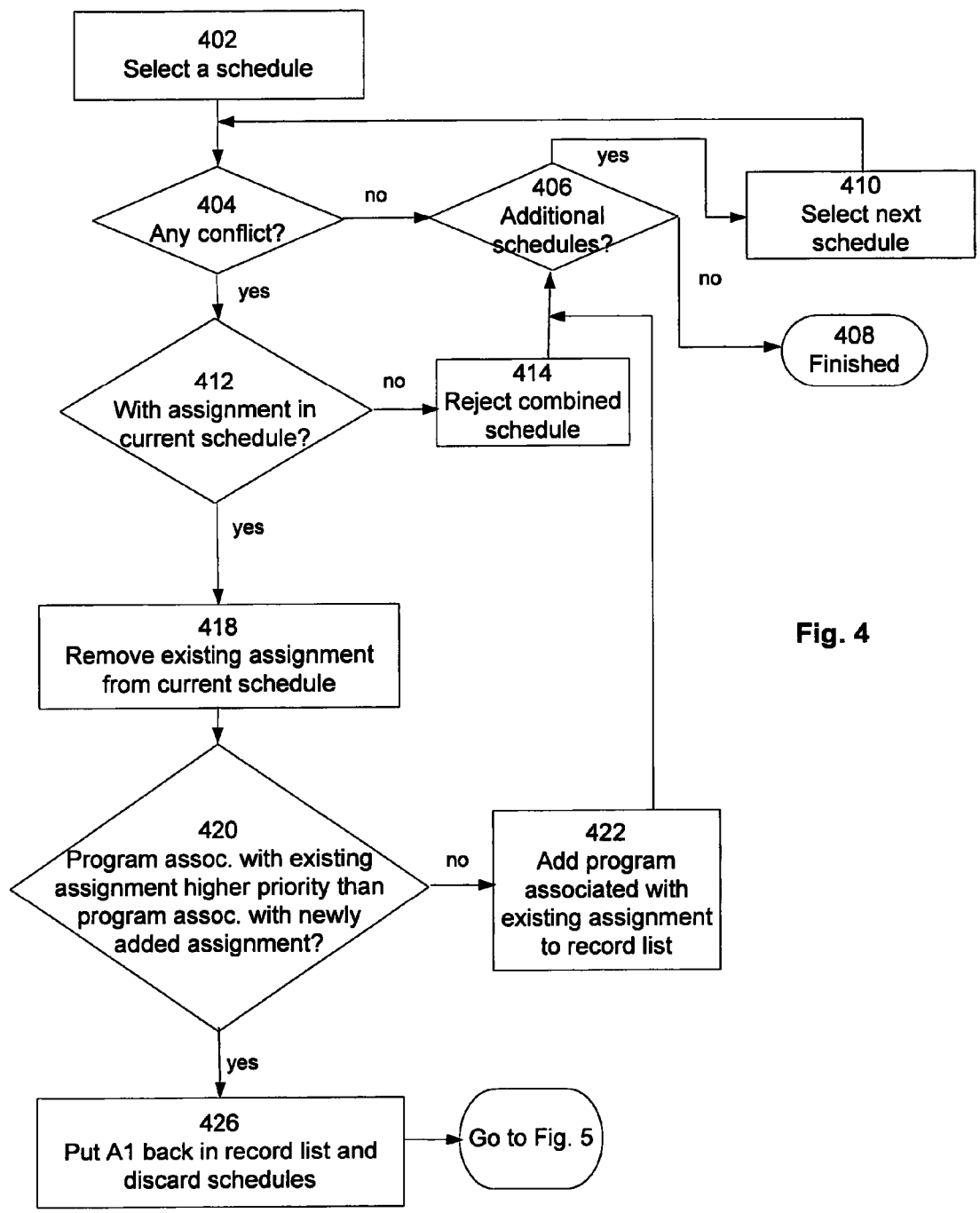
FIGS. 4-5 depict a flow diagram providing exemplary steps for rescheduling content in an existing recording schedule.
Figure 5:
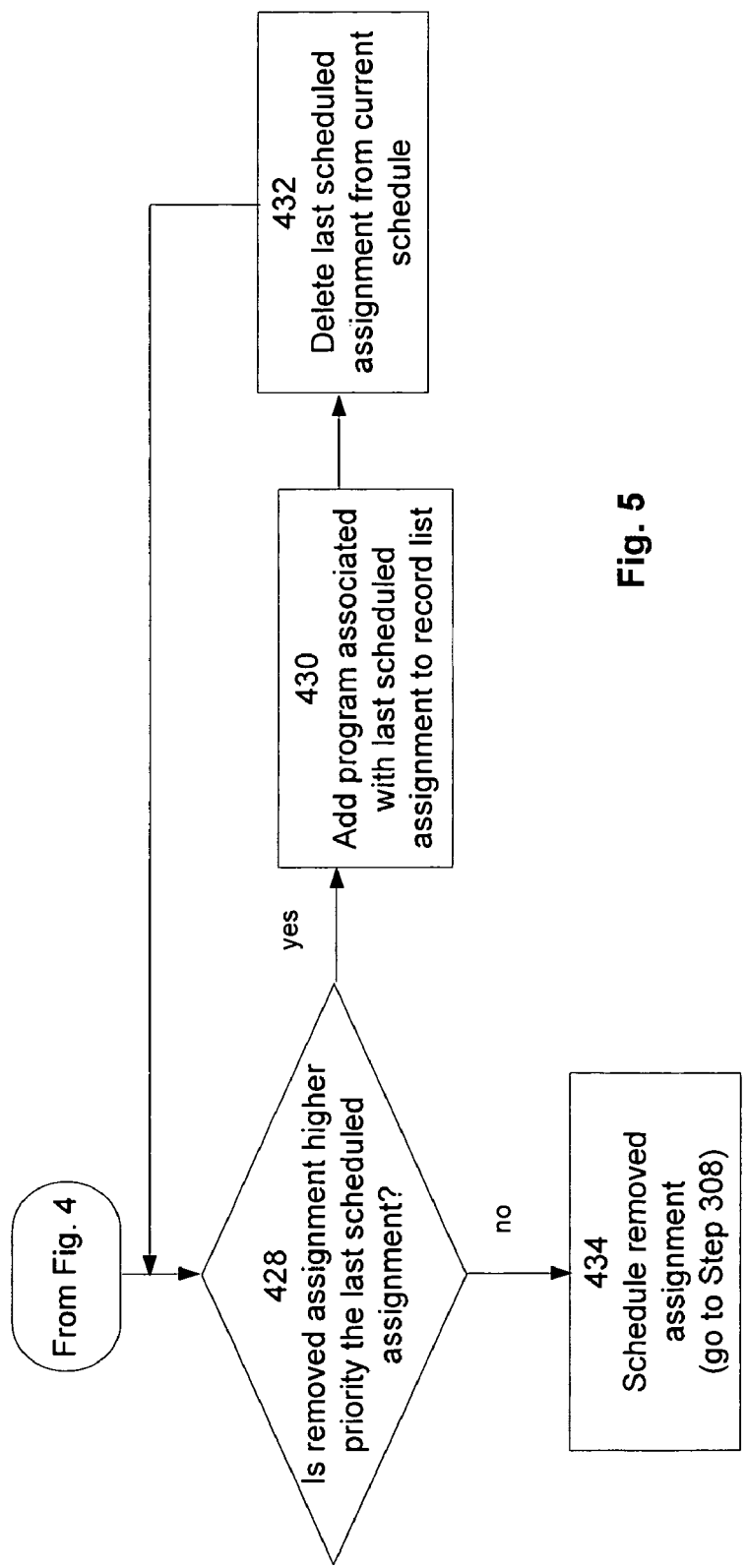

FIGS. 4-5 illustrate a method for evaluating whether to reject or modify a combined schedule (e.g., NewSchedule or LatestSchedule) containing one or more conflicting assignments. During this evaluation process (see steps 312 and 324 in FIG. 3), programs may be added to the record list to be rescheduled later.

For the purpose of describing the interrogation process in FIGS. 4-5 only, the existing recording schedule (referred to as "{existing schedule}") recalled in step 306 includes three assignments for three programs previously requested to be recorded by the user. The assignments included in the {existing schedule} are A1, B1 and C1. Thus, in step 312, the method generates the following three recording schedules by adding each assignment of Program TO in the preferred group to the current recording schedule in priority order:

(i) {existing schedule}+TO1 (referred to as "NewScheduleX");
(ii) {existing schedule}+TO2 (referred to as "NewScheduleY"); and
(iii) {existing schedule}+TO3 (referred to as "NewScheduleZ").

In step 402, NewScheduleX is selected first for evaluation. The method may of course choose to interrogate the NewSchedules in any order. In step 404, the method determines if NewScheduleX contains any conflicting assignments. If TO1 does not conflict with any of the assignment in the {existing schedule}, NewScheduleX is valid and the method continues to step 406. In step 406, the method determines if there are any other NewSchedules. If there are no additional NewSchedules, the method continues to step 408 and the interrogation process is complete. Here, however, there are two additional NewSchedules—NewScheduleY and NewScheduleZ. In step 410, NewScheduleY is selected and step 404 is repeated.

If, in step 404, it is determined that TO1 conflicts with an assignment in the {existing schedule}, the method continues to step 412. In step 412, the method determines whether TO1 conflicts with one of the assignments already scheduled in the {existing schedule}. For the purpose of describing this technology, TO1 conflicts with assignment C1 in the {existing schedule}. In step 418, the conflicting assignment C1 is removed from NewScheduleX.

In step 420, the priority of the program associated with the removed assignment C1 (referred to as "Program C") is compared to the priority of Program TO. If Program C is a lower priority program than Program TO, the method continues to step 422. In step 422, Program C is added to the record list. The method shown in FIG. 3 will reschedule Program C at a later time.

If Program C is higher-priority program than Program TO, TO1 is returned to the record list and NewScheduleX, NewScheduleY and NewScheduleZ are discarded, in step 426. At this point, a process begins to ensure that the assignments in the {existing schedule} were scheduled in priority order. In step 428, the priority associated with the assignment just removed from the {existing schedule}, C1, is compared to the priority of the assignment scheduled prior to C1 in the {existing schedule}. Here, the priority of Program C is compared to the priority of Program B (the program associated with B1). If C1 is not higher-priority than B1, the method continues to step 434. In step 434, the method returns to step 308 and identifies the assignments associated with Program C. Program C is rescheduled back into the {existing schedule}, which now includes TO1, according to the method shown in FIG. 3.

If the removed assignment, C1, is higher-priority than B1, the method continues to step 430. In step 430, the Program associated with C1 (Program C) is added to the record list. The method returns to step 428 and determines if Program C is higher-priority than the program associated with B1 (Program B). If it is not, the method continues to step 434 and reschedules Program C. If it is higher priority, the method repeats steps 430-432.

Figure 6:
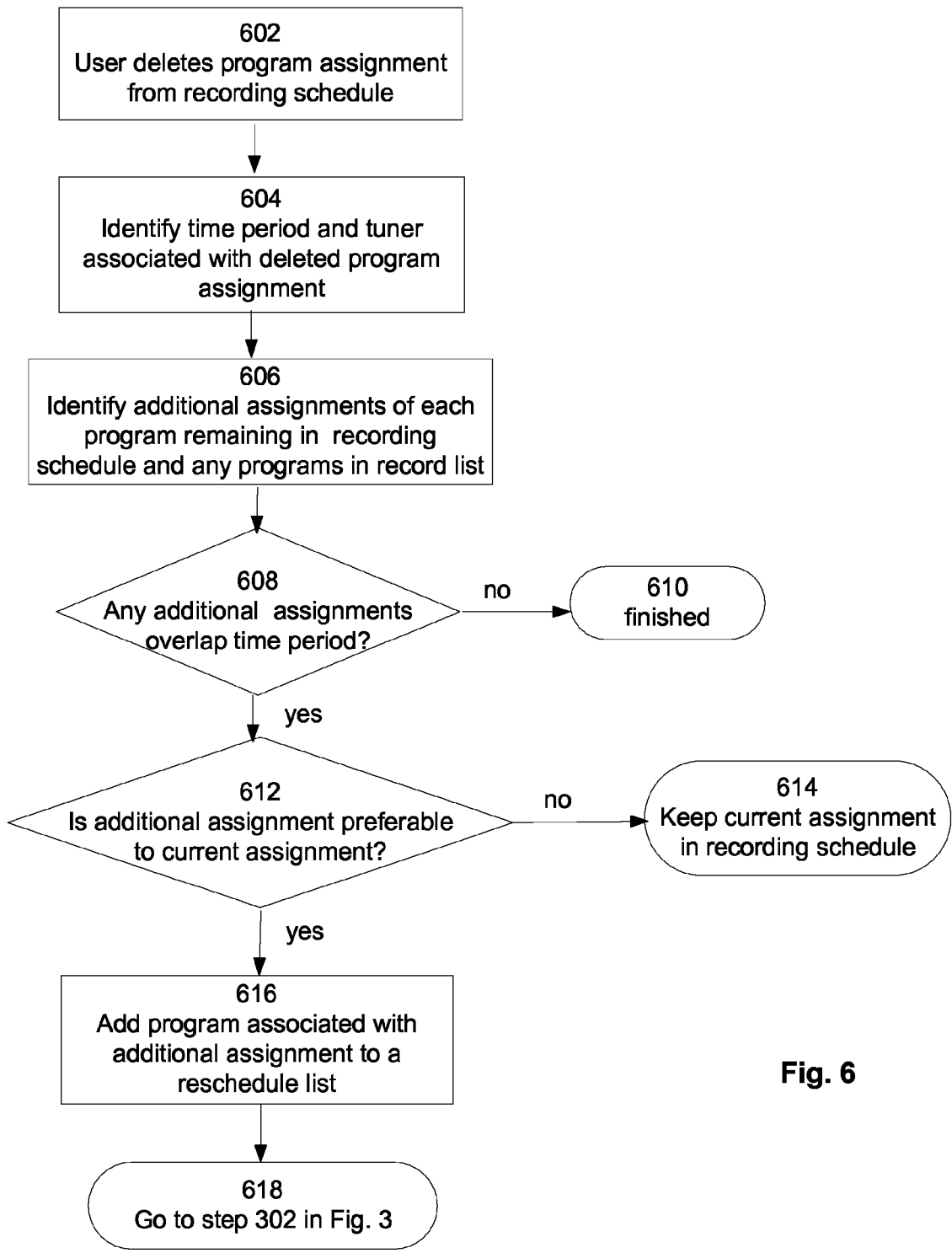
FIG. 6 depicts a flow diagram providing exemplary steps associated with another embodiment for generating a new recording schedule.

FIG. 6 illustrates a method for generating a new recording schedule when the user deletes a program from the existing or current recording schedule. In step 602, the user deletes a program assignment from the existing recording schedule. For the purpose of describing FIG. 6 only, the {existing schedule} is {A1+B2+C1+TO2}, there are no programs in the record list and the user deletes C1 (which designates recording Program C, cable channel 704, Thursday between 9 pm-10 pm, tuner A).

In step 604, the airing time and tuner designated by the deleted assignment are identified. The airing time and tuner is effectively freed-up from the {existing schedule}. Using the example provided above, tuner A and the airing time 9-10 pm are identified as freed-up as a result of the deleted assignment. In step 606, assignments associated with each remaining program in the {existing schedule} and assignments of each program still in the record list are identified. After C1 is deleted, the {existing schedule} includes {A1+B2+TO2}. Using the example provide above, other assignments associated with Program A (e.g., A2 and A3), Program B (e.g., B1 and B3) and Program TO (e.g., TO1 and TO3) are identified.

In step 608, the method determines if any of the other assignments associated with Program A, Program B or Program TO overlap the time period previously occupied by C1. If none of the other assignments identified in step 606 overlap with the 9-10 pm time period on tuner A, the {existing schedule} is maintained as {A1+B1+TO1}, in step 608. If any of the other assignment (A2, A3, B1, B3, TO1, etc.) overlap the time period Thursday, 9-10 pm, the method continues to step 612.

In step 612, the method determines if any of the other overlapping assignments are preferable to the current assignment in the {existing schedule}, program by program. There are many reasons why one of the other overlapping assignments may be preferable. By way of example only, one of the other assignments may be preferable if it designates an earlier airing time than the existing assignment, designates recording an HD broadcast of the program when the existing assignment designates recording an SD broadcast, the program's current assignment is <none>, and so on. If the other assignment (e.g., A2) is not preferable over the assignment in the {existing schedule} (e.g., A1), the existing assignment (A1) is maintained, in step 614. If the other assignment (e.g., B1) is preferable to the assignment in the {existing schedule} (e.g., B2), the program associated with both assignments (Program B) is added to the record list. In step 618, the method shown in FIG. 3 reschedules each of the programs contained in the record list.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method of modifying an existing recording schedule, comprising:
    (a) receiving a request from a user to record a program;
    (b) identifying a plurality of recording assignments associated with the program designated in the request received in step (a), each recording assignment associated with the program designated in the request received in step (a) designating a channel, an airing time and a tuner associated with the program designated in the request received in step (a);
    (c) sorting the plurality of recording assignments associated with the program designated in the request received in step (a) and identified in step (b) into a weighted order according to a comparison operator, sorting the plurality of recording assignments associated with the program designated in the request received in step (a) including ranking the plurality of recording assignments according to one or more properties;
    (d) separating the weighted order of the plurality of recording assignments into multiple groups of recording assignments responsive to said step of sorting, wherein one of the groups of recording assignments is designated as a preferred group of recording assignments;
    (e) combining the existing recording schedule and each of the recording assignments from the preferred group of recording assignments to generate new recording schedules, wherein each new recording schedule is a combination of the existing recording schedule and one of the recording assignments from the preferred group of recording assignments;
    (f) reducing the new recording schedules generated in step (e) to a final recording schedule;
    (g) replacing the existing recording schedule with the final recording schedule; and
    (m) downloading the final recording schedule to a digital recording device.

2. The method as recited in claim 1, further comprising the step of:
    (h) sorting the recording assignments within each group of recording assignments according to a second comparison operator.

3. The method as recited in claim 2, wherein the second comparison operator comprises:
    organizing the recording assignments according to airing time.

4. The method as recited in claim 1, wherein sorting the recording assignments identified in step (b) into a weighted order according to the comparison operator comprises the step of:
    ranking the recording assignments according to at least one of the following defining properties: (i) broadcast quality, (ii) broadcast urgency, and (iii) user preferences.

5. The method as recited claim 4, wherein separating the weighted order of recording assignments into multiple groups of recording assignments in step (d) comprises the step of:

grouping the recording assignments that received the same ranking together.

6. The method as recited in claim 1, further comprising the steps of:
(h) evaluating each of the new recording schedules generated in step (e) to determine if the new recording schedule includes a conflict; and
(i) if the new recording schedule includes a conflict, interrogating whether to discard the new recording schedule or modify the new recording schedule.

7. The method as recited in claim 1, wherein generating new recording schedules in step (e) further comprises the step of:
(i) evaluating the validity of each new recording schedule generated in step (e); and
(ii) if none of the new recording schedules generated in step (e) are valid, generating a second set of new recording schedules by combining the existing recording schedule with each of the recording assignments in the second-most preferred group of recording assignments.

8. A method for modifying an existing recording schedule including multiple program assignments, comprising the steps of:
(a) deleting one of the program assignments from the existing recording schedule, each of the multiple program assignments designating a channel, an airing time and a tuner;
(b) identifying an airing time and tuner associated with the deleted program assignment;
(c) for each program assignment remaining in the existing recording schedule,
(i) identifying a program associated with the program assignment remaining in the existing recording schedule, said program identified in step c(i) is associated with multiple program assignments, at least one of the multiple program assignments associated with the program identified in step c(i) is the program assignment remaining in the existing recording schedule;
(ii) identifying other program assignments associated with the program identified in step c(i) that designate an airing time that overlap with the airing time identified in step (b);
(iii) determining whether any of the other program assignments identified in step (c)(ii) are preferable to the program assignment currently in the existing recording schedule;
(d) if one of the other program assignments identified in step (c)(ii) is preferable to the program assignment currently in the existing recording schedule for the same program,
(i) removing the program assignment currently in the existing recording schedule from the existing recording schedule;
(ii) designating the program identified in step (c)(i) to be rescheduled back into the existing recording schedule;
(iii) generating a new recording schedule; and
(iv) downloading the new recording schedule to a digital recording device.

9. The method as recited in claim 8, wherein determining whether any of the other program assignments identified in step (c)(ii) are preferable to the program assignment currently in the existing recording schedule comprises the step of:
comparing each of the other program assignments identified in step (c)(ii) with the program assignment currently in the existing recording schedule according to a first comparison operator.

10. The method as recited in claim 9, wherein the first comparison operator allows a sorting algorithm to compare the program assignments identified in step (c)(ii) with the program assignment in the existing recording schedule according to at least one of the following defining properties: (i) broadcast quality, (ii) broadcast time, and (iii) broadcast urgency.

11. The method as recited in claim 8 wherein the new recording schedule includes other program assignments associated with the programs designated for rescheduling in step (d)(ii) and the program assignments from the existing recording schedule that did not have an overlapping airing time identified in step (c)(ii).

12. The method as recited in claim 8, further comprising the step of:
(e) maintaining the existing recording schedule if none of the other program assignments identified in step (c)(ii) are preferable to the program assignment currently in the existing recording schedule for the same program.

13. One or more processor readable storage devices having processor readable code embodied on said processor readable storage devices, said processor readable code for programming one or more processors to perform a method comprising:
(a) prioritizing a list of programs to record;
(b) identifying a plurality of program assignments associated with a highest-priority program among the list of programs, each program assignment associated with the highest-priority program designating a channel, an airing time and a tuner associated with the highest-priority program;
(c) sorting the plurality of program assignments associated with the highest-priority program and identified in step (b) into a weighted order according to a comparison operator;
(d) combining each program assignment associated with the highest-priority program and identified in step (b) with the latest recording schedule in the order sorted in step (c), wherein each combination of a program assignment with the latest recording schedule creates a potential new recording schedule;
(e) evaluating whether any of the potential new recording schedules include a conflict between the program assignment added to the latest recording schedule and any of the program assignments included in the latest recording schedule;
(f) selecting one of the potential new recording schedules that does not include a conflict between the program assignment added to the latest recording schedule and any of the program assignments included in the latest recording schedule; and
(g) replacing the latest recording schedule with the potential new recording schedule selected in step (f).

14. The one or more processor readable storage devices as recited in claim 13, wherein sorting the program assignments identified in step (b) into a weighted order according the comparison operator comprises the step of:
ranking the program assignments according to at least one of the following defining properties: (i) broadcast quality, (ii) broadcast urgency, and (iii) user preferences.

15. The one or more processor readable storage devices as recited claim 14, further comprising:
(h) separating the ranked program assignments into groups of program assignments.

16. The one or more processor readable storage devices as recited in claim 15, wherein sorting the program assignments in step (c) comprises the step of:
placing the program assignments with the same ranking into the same group.

17. The one or more processor readable storage devices as recited in claim 13, wherein evaluating whether any of the potential new recording schedules include a conflict between the program assignment added to the latest recording schedule and any of the program assignments included in the latest recording schedule in step (3) comprises the step of:
determining whether the program assignment added to the latest recording schedule designates an airing time that overlaps with an airing time associated with a program assignment in the latest recording schedule.

18. The one or more processor readable storage devices as recited in claim 17, further comprising the step of:
(h) discarding the potential new recording schedule if it is determined that a conflict exists between the program assignment added to the latest recording schedule and a program assignment in the latest recording schedule.

\* \* \* \* \*